United States Patent [19]

Hawerkamp

[11] Patent Number: 4,513,605
[45] Date of Patent: Apr. 30, 1985

[54] METHOD AND DEVICE FOR TESTING WELDS OF THERMOPLASTIC PARTS

[76] Inventor: Manfred Hawerkamp, Altenrather Strasse 47, 5210 Troisdorf, Fed. Rep. of Germany

[21] Appl. No.: 455,484

[22] Filed: Jan. 4, 1983

[30] Foreign Application Priority Data

Jan. 20, 1982 [DE] Fed. Rep. of Germany ....... 3201515

[51] Int. Cl.³ .............................................. G01M 3/28
[52] U.S. Cl. ............................................ 73/40; 73/46
[58] Field of Search ..................... 73/40, 46, 49.8; 228/103

[56] References Cited

U.S. PATENT DOCUMENTS

| | | | |
|---|---|---|---|
| 2,108,176 | 2/1938 | Newby | 73/40 |
| 2,817,230 | 12/1957 | McCully | 73/46 |
| 3,043,129 | 7/1962 | King | 73/40 |
| 3,524,342 | 8/1970 | Hobbs | 73/40 |
| 4,040,289 | 8/1977 | Clark et al. | 73/46 |

FOREIGN PATENT DOCUMENTS

| | | | |
|---|---|---|---|
| 450941 | 9/1927 | Fed. Rep. of Germany | 73/37 |
| 453187 | 11/1927 | Fed. Rep. of Germany | 73/40 |
| 857777 | 9/1940 | France | 73/40 |
| 1480489 | 5/1965 | France | 73/46 |
| 317017 | 4/1934 | Italy | 73/40 |
| 119867 | 1/1976 | Japan | 228/103 |
| 166529 | 1/1934 | Switzerland | 73/40 |
| 215694 | 10/1941 | Switzerland | 73/40 |
| 191863 | 1/1967 | U.S.S.R. | 73/40 |

*Primary Examiner*—Stephen A. Kreitman
*Assistant Examiner*—Hezron Williams
*Attorney, Agent, or Firm*—McGlew and Tuttle

[57] ABSTRACT

A method of testing a weld joint interconnecting two thermoplastic parts comprises forming a sealed cavity around the weld joining the parts and applying a predetermined test pressure to the cavity to determine if there is any leakage thereof. The device of the invention comprises an additional wall structure which defines a seal cavity around the weld joining two thermoplastic parts and which is advantageously made by an additional weld or welds which forms the test cavity surrounding the welded joint to be tested.

1 Claim, 4 Drawing Figures

METHOD AND DEVICE FOR TESTING WELDS OF THERMOPLASTIC PARTS

FIELD AND BACKGROUND OF THE INVENTION

This invention relates in general to welding and in particular to a new and useful method and device for testing welds of thermoplastic welded constructional parts particularly welded tubes and receptacles of plastic.

To test welds of plastic constructional parts, mechanical testing methods are known requiring the weld to be cut out of a structure. Such a destruction of the finished welded construction part is expensive and unsatisfactory. The same goes for pressure tests in which the entire welded construction, for example a pressure tube or container of plastic, must be exposed to pressure. Such a pressure test of the entire structue may even be impossible due either to structural and technological reasons, or the absence of a suitable equipment.

SUMMARY OF THE INVENTION

The invention is directed to a method and device permitting the testing of a weld of a respective structure of plastic in a non-destructive manner.

In accordance with the invention a pressure cavity is formed around the weld to be tested and this is done for example by forming an additional weld spaced from the weld to be tested to seal a space over the weld to be tested.

With the invention the weld alone is subjected to a test, directly in the construction where it is produced, without the necessity of cutting it out of the structure. The inventive non-destructive testing method is simple and reliable in operation, since in practice, the respective weld can be tested from the outside so that the method can easily be applied even to complicated structures of plastic material.

In a preferred modification of the method, the weld is enclosed by thermoplastic. Of course, the shell and its connections to the structure of the plastic must be provided in such shape and at such location that upon pressurizing the test cavity, the weld to be tested is in fact exposed to the test pressure.

In another modification of the inventive method, an additional gap weld is applied to the structure to form a sealed cavity. This may be practical for bell-and-spigot connections of tubes, for example with the pressure cavity formed between the two metals in the overlap zone. However, even if two plastic parts, such as wall portions of a tube or of a receptacle, are welded to each other endwise, a pressure cavity may be formed between the otherwise abutting end faces by spacing them correspondingly apart, with the connecting welds forming the other walls of the cavity. In a similar way, a pressure cavity may be formed if plastic parts are welded to each other at an angle, for example at right angles.

To pressurize the cavity, preferably a gaseous or liquid fluid is employed and the cavity may be connected to a leak indicator to provide information, for example, whether upon applying the test pressure, the weld to be tested became cracked and thus leaky.

The invention further relates to a device for testing a device particularly in a plastic receptacle or tube, including means defining a cavity around the wall to be tested. Advantageously, a connection for applying pressure fluid opens into the pressure cavity. Further, the pressure cavity is preferably connected to a leak indicator.

Substantially, the invention has the advantage of providing a test method, which is particularly simple and inexpensive, and since it it non-destructive, can be applied directly to the tested plastic structure so that it is no longer necessary to cut the test portion out. This makes possible an expedient and inexpensive testing of tubes and receptacles made of plastic materials.

Accordingly it is an object of the invention to provide an improved method of testing welds of interconnected plastic parts which comprises forming a cavity around the weld to be tested and applying a fluid to the cavity and determining any leakage therefrom.

A further object of the invention is to provide an apparatus for testing welds which comprises means defining a cavity around the weld to be tested and means for supplying a fluid pressure to the cavity.

A further object of the invention is to provide an apparatus for testing welds of thermoplastic parts which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 2:
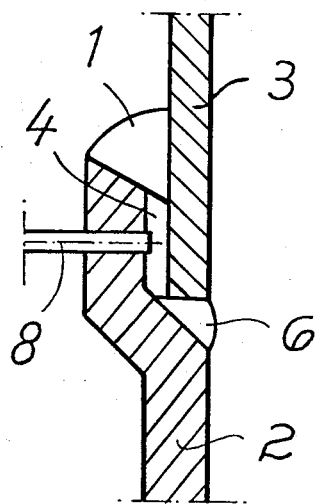
FIG. 2 is a view similar to FIG. 1 of two overlapping plastic parts such as tubes, connected through a bell-and-spigot joint which is fixed by two separate welds.

Referring to the drawings in particular the invention embodied therein comprises an apparatus and method for testing weld joints 1 between two parts of thermoplastic material 2 and 3 which are to be joined. In accordance with the invention, the pressure cavity 4 is formed around the weld joint 1 to be tested and a fluid pressure is admitted to the cavity through a connection 8 so as to detect whether a leakage in the cavity occurs. The device of the invention comprises means defining the cavity 4 which in the embodiment of FIG. 1 comprises a separate shell or cavity forming parts 5, which is applied over the weld 1 to be tested so as to define the pressure space 4. In the other embodiments, for example, the cavity 4 may be formed by parts of the elements to be joined themselves merely by applying another weld 6 as shown in FIG. 2 to enclose the pressure space 4.

In all of the embodiments shown in FIGS. 1 to 4, the weld 1 to be tested and the plastic parts 2 and 3 which are connected by the weld are used to form wall portions of a provided pressure cavity 4. To test the respective weld 1 for strength and tightness, pressure cavity 4 is then pressurized with a predetermined pressure.

Figure 1:
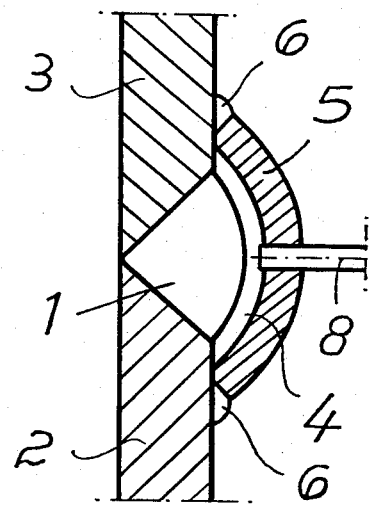
FIG. 1 is a partial sectional view of two plastic parts, for example tube lengths, which are connected to each other by a weld to be tested, with the weld being bridged by a shell constructed in accordance with the invention.

According to FIG. 1, the weld 1 to be tested is enclosed by means defining a pressure cavity around the weld in the form of a shell 5 of thermoplastic material which is welded to the parts connected by the weld 1 so that the pressure cavity 4 is formed.

Figure 4:
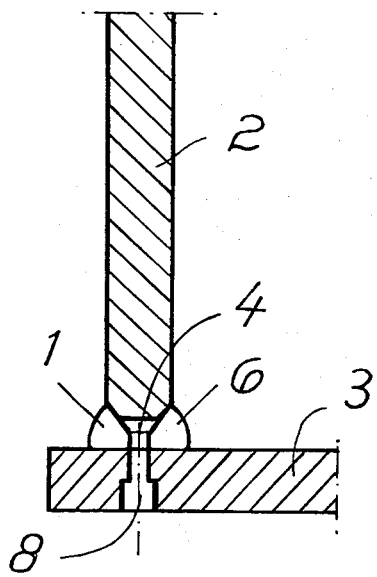
FIG. 4 is a view similar to FIG. 1 of two parts at right angles to each other.
Figure 3:
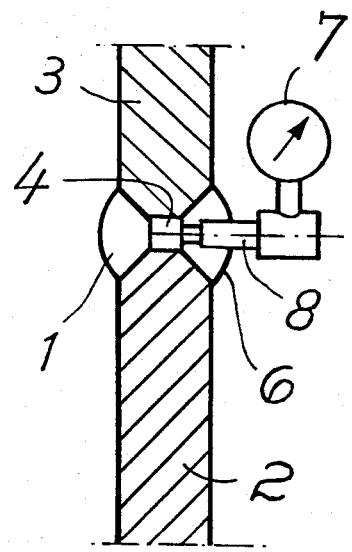
FIG. 3 is a view similar to FIG. 1 of two endwise abutting parts welded together by means of two welds which are spaced apart to form the pressure cavity.

According to all of the embodiments of FIGS. 2 to 4, the plastic parts 2 and 3 are connected to each other in addition by another separate weld or welds 6, which are spaced from the first weld 1, so that the pressure cavity 4 is formed therebetween. A gaseous or liquid fluid is then used for pressurizing the cavity, which fluid is introduced through a connection or conduit 8. A leak indicator 7 may be connected to the pressure cavity as shown in FIG. 3. The plastic parts 2 and 3 may be all portions of a tube or receptacle, or ball-end-secured tubes.

In the embodiment of FIGS. 3 and 4, the two plastic parts 2 and 3 are held at a spaced relationship from each other. They are then welded together by a pair of welds 1 and 2 which are also spaced apart to define cavity 4. In FIG. 3 a hole is drilled through the weld 6 to connect the conduit 8 and leak indicator 7. While the absence of a leak will indicate the integrity of both weld 1 and weld 6, the measurement is clearly useful since the integrity of weld 1, which is being tested, is assured. In both FIGS. 3 and 4, at least one of the thermoplastic parts has an edge with opposite sides, one of which is joined by weld 1 to the other part and the other of which is joined by weld 6 to the other part. In the embodiment of FIG. 3, both thermoplastic parts have an edge with the welds connected between opposite sides of the edge.

While specific embodiments of the invention have been shown and described in detail to illustrate the application of the principles of the invention, it will be understood that the invention may be embodied otherwise without departing from such principles.

What is claimed is:

1. A method of testing a weld (1) between a first (2) and a second (3) constructional part made of thermoplastic material, the first and second parts each having edges with two opposite sides and the weld extending from one of the two opposite sides to the first part to one of the two opposite sides of the second part, comprising:

establishing a space between the edge of the first part (2) and the edge of the second part (3) before the weld to be tested (1) is formed;

forming an additional weld (6) between the other of the two opposite sides of the first part (2) and the other of the two opposite sides of the second part (3), the additional weld (6) spaced from the weld to be tested (1) to define a closed pressure cavity (4) between the first and second parts;

drilling a hole through the additional weld;

attaching a conduit (8) to the additional weld (6) which communicates with the hole;

supplying a fluid under pressure to establish a predetermined test pressure in the pressure cavity; and detecting a leakage of the fluid supplied to the pressure cavity using a leak detector connected to the conduit.

* * * * *